United States Patent
Rose et al.

(10) Patent No.: US 8,867,745 B2
(45) Date of Patent: Oct. 21, 2014

(54) EFFICIENT TRANSMISSION OF CRYPTOGRAPHIC INFORMATION IN SECURE REAL TIME PROTOCOL

(75) Inventors: Gregory Gordon Rose, San Diego, CA (US); Raymond Tah-Sheng Hsu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1675 days.

(21) Appl. No.: 11/083,686

(22) Filed: Mar. 17, 2005

(65) Prior Publication Data

US 2005/0254656 A1    Nov. 17, 2005

Related U.S. Application Data

(60) Provisional application No. 60/554,311, filed on Mar. 18, 2004.

(51) Int. Cl.
*H04L 9/00* (2006.01)
*H04L 9/08* (2006.01)
*H04L 29/06* (2006.01)

(52) U.S. Cl.
CPC ........... *H04L 9/0894* (2013.01); *H04L 2209/20* (2013.01); *H04L 63/0428* (2013.01)
USPC .......................................... 380/277; 380/278

(58) Field of Classification Search
CPC ............................... H04L 9/08; H04L 9/0883
USPC .................... 380/44, 277–279, 281
See application file for complete search history.

(56) References Cited

U.S. PATENT DOCUMENTS

| | | | | |
|---|---|---|---|---|
| 5,757,922 | A * | 5/1998 | Shiroshita | 380/42 |
| 2001/0008997 | A1* | 7/2001 | Masuda et al. | 705/8 |
| 2002/0001386 | A1* | 1/2002 | Akiyama | 380/201 |
| 2002/0073311 | A1* | 6/2002 | Futamura et al. | 713/157 |
| 2002/0112164 | A1* | 8/2002 | Schmeling et al. | 713/176 |
| 2003/0002680 | A1* | 1/2003 | Akiyama et al. | 380/278 |

(Continued)

FOREIGN PATENT DOCUMENTS

| | | |
|---|---|---|
| JP | 8-186547 | 7/1996 |
| JP | 2002-27417 | 1/2002 |

(Continued)

OTHER PUBLICATIONS

Baugher et al., "The Secure Real-time Transport Protocol," Internet Engineering Task Force Standard Working Draft, XP015001427 (2003).

(Continued)

*Primary Examiner* — Farid Homayounmehr
*Assistant Examiner* — Suman Debnath
(74) *Attorney, Agent, or Firm* — Won Tae Kim

(57) ABSTRACT

Efficient transmission of cryptographic information in secure real time protocol. A transmitting terminal may be used to encrypt data with a session key derived from a bit-stream. The bit-stream may be sent with header information to the receiving terminal. To conserve bandwidth, the information may be divided into portions, and each portion transmitted with an encrypted data packet. The receiving terminal may be used to recover the bit-stream from the information portions in the packet headers, and use the bit-stream to derive the session key. The session key may be used to decrypt the data.

23 Claims, 4 Drawing Sheets

(56) References Cited

U.S. PATENT DOCUMENTS

| | | | |
|---|---|---|---|
| 2003/0021417 | A1* | 1/2003 | Vasic et al. .................... 380/277 |
| 2003/0070092 | A1 | 4/2003 | Hawkes et al. |
| 2003/0081773 | A1 | 5/2003 | Sugahara et al. |
| 2003/0088782 | A1 | 5/2003 | Forrest |
| 2003/0115154 | A1* | 6/2003 | Anderson et al. ............... 705/73 |
| 2004/0174824 | A1* | 9/2004 | Ohta et al. .................... 370/252 |
| 2005/0120213 | A1* | 6/2005 | Winget et al. ................. 713/171 |
| 2005/0138355 | A1* | 6/2005 | Chen et al. .................... 713/155 |

FOREIGN PATENT DOCUMENTS

| | | |
|---|---|---|
| JP | 2002-124952 | 4/2002 |
| JP | 2003-134106 | 5/2003 |
| JP | 2004-32307 | 1/2004 |

OTHER PUBLICATIONS

OA dated Feb. 11, 2008 for Indian Application No. 5492/DELNP/2006, 7 pages.

Baugher, et al: "The Secure Real-time Transport Protocol" IEFT Standard-Working-Draft, Internet Engineering Task Force, Jul. 2003, XP015001427 ISSN: 0000-0004, p. 6-p. 10; p. 20-p. 37; p. 44-p. 47.

Mexican Office Action dated Mar. 19, 2009, mailed Apr. 22, 2009 for Mexican Application Serial No. PA/a/2006/010646, 2 pages.

OA Dated May 8, 2009 for Chinese Application No. 200580015695.X, 27 pages.

OA Dated Jun. 5, 2009 for Vietnamese Application No. 1-2006-01725, 1 page.

OA Dated Apr. 30, 2008 for Australian Application No. 2005223962, 2 pages.

OA Dated Jun. 10, 2008 for European Application No. 05725797.4-2415, 4 pages.

International Search Report dated Aug. 1, 2005 for PCT Application Serial No. PCT/US2005/008858, 3 Pages.

OA Dated Sep. 28, 2007 for Korean Application No. 10-2006-7021621, 8 pages.

OA Dated Mar. 23, 2009 for Phillippine Application No. 1-2006-501832, 1 page.

OA Dated Oct. 7, 2007 for Singapore Application No. 200606404-2, 4 pages.

Mexican Office Action dated Jul. 28, 2009 for Mexican Application Serial No. PA/a/2006/010646, 2 pages.

Russian Office Action dated Dec. 27, 2007 for Russian Application Serial No. 2006136800, 21 pages.

Schulzrinne, et al. "RTP: A Transport Protocol for Real-Time Applications," RFC Editor, USA, Jul. 2003, Request for Comments: 3550, 98 pages.

Japanese Office Action dated Apr. 6, 2010, for Japanese Application Serial No. 2007-504093, 11 pages.

Philippine Office Action dated Apr. 28, 2010, for Philippine Application Serial No. 12006501832, 2 pages.

Israel Office Action dated Aug. 15, 2010, for Israel Application Serial No. 178144, 1 page.

Japanese Office Action dated Oct. 14, 2010, for Japanese Application Serial No. 2007-504093, 3 pages.

Chinese Office Action dated Sep. 1, 2011, for Chinese Patent Application Serial No. 200580015695.X, 10 pages.

Written Opinion—PCT/US2005/008858, International Search Authority—European Patent Office—Aug. 1, 2005.

Canadian Office Action dated Jan. 15, 2010, for Canadian Patent Application Serial No. 2560550, 2 pages.

Chinese Office Action dated Feb. 10, 2010, for Chinese Patent Application Serial No. 200580015695.X, 33 pages.

* cited by examiner

EFFICIENT TRANSMISSION OF CRYPTOGRAPHIC INFORMATION IN SECURE REAL TIME PROTOCOL

CROSS REFERENCE

This present application claims priority to Provisional Application No. 60/554,311 entitled "Efficient Transmission of Cryptographic Information in Secure Real Time Protocol," filed Mar. 18, 2004, the contents of which is expressly incorporated herein by reference as though fully set forth in full.

BACKGROUND

1. Field

The present disclosure relates generally to security in data processing systems, and more particularly, efficient transmission of cryptographic information in secure real time protocol.

2. Background

Real Time Protocol (RTP) is an Internet protocol standard for real time transmission of multimedia data. Today, RTP supports numerous multimedia applications including, by way of example, multicast and unicast network services. Multicast network services are usually associated with a multimedia transmission from a content provider to any number of distributed subscribers. Unicast network services are usually associated with a multimedia transmission from a content provider to a single subscriber. In either case, the subscriber can view the multimedia data in real time, or download the data for later viewing.

As the demand for multimedia applications continues to grow, the need for secured transport of multimedia content becomes more apparent. A new standard, called Secure Real Time Protocol (SRTP), has recently emerged in the telecommunications industry to address this need. SRTP can provide confidentiality, message authentication, and data integrity for RTP traffic. SRTP can also protect against active attacks such as replay attack and the like.

In SRPT, traffic is transported in packets. Namely, data to be transmitted is broken into packets. Each packet includes a header and payload. Using a same session key, the payload is encrypted at the transmitting end and decrypted at the receiving end. The session key is a short term key that is changed periodically, typically multiple times during a single multimedia broadcast. A master key is used to derive the session key in a cryptographically secure way. More particularly, a short term random number (SK_RAND), generated by the transmitting end and sent to the receiving end, is applied to a key derivation function at both ends using the master key to produce the session key. The master key is typically a long term key that remains valid for the subscription period of the multimedia subscriber.

The SRTP also includes an optional field called a Master Key Identifier (MKI). This field may be included in the SRPT header. The MKI may be used to identify the master key from which the session key(s) were derived and may be used for other key management. In multicast network services, such as broadcast systems, the SK-RAND and other information is carried by the MKI.

However, SRTP requires that the MKI information be sent with every packet, or none of the packets, thereby wasting valuable bandwidth. Accordingly, there is a need for a more efficient and/or effective way to send the MKI in SRTP.

SUMMARY

A method of transmitting Master Key Identifier (MKI) information using secure real time protocol is disclosed. The method includes dividing MKI information into a plurality of portions, attaching a portion of the MKI information to a data packet, and transmitting the data packet with the attached portion of the MKI information.

A method of receiving Master Key Identifier (MKI) information using secure real time protocol is disclosed. The method includes receiving a plurality of data packets, each being attached to a different portion of the MKI information, and recovering the MKI information from the received portions of the MKI information.

An apparatus with secure real time protocol capability is disclosed. The apparatus includes means for dividing MKI information into a plurality of portions, means for attaching a portion of the MKI information to a data packet, and means for transmitting the data packet with the attached portion of the MKI information.

Another apparatus with secure real time protocol capability is disclosed. The apparatus includes means for receiving a plurality of data packets, each being attached to a different portion of the MKI information, and means for recovering the MKI information from the received portions of the MKI information.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
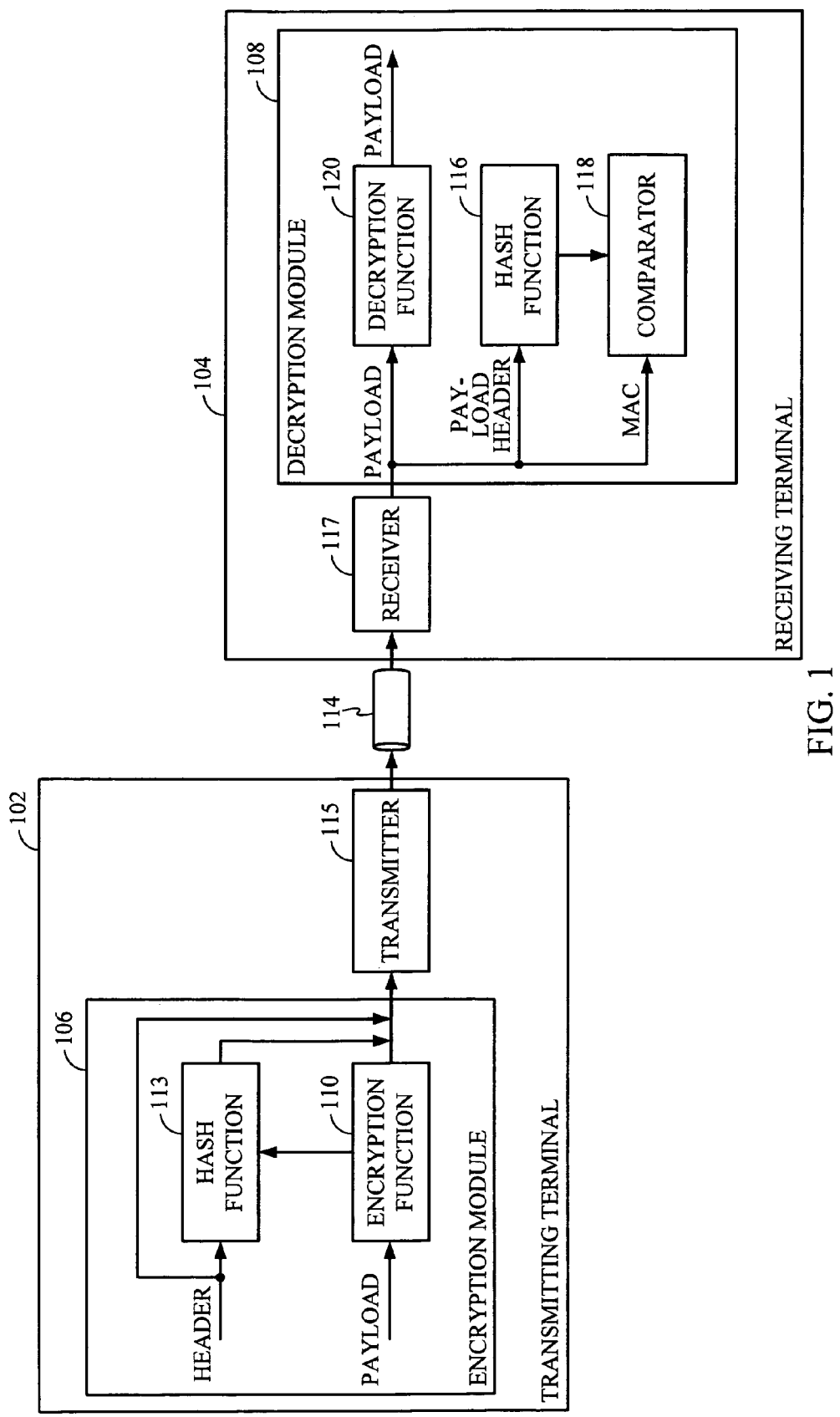
FIG. 1 is a functional block diagram illustrating an example of a transmitting and receiving terminal in a communications system.

FIG. 1 is a functional block diagram illustrating an example of a transmitting and receiving terminal in a communications system. The transmitting and receiving terminals 102, 104 may be any suitable devices capable of supporting SRTP multimedia applications including, wired and wireless telephones, computers, laptops, personal digital assistants (PDA), broadcast equipment, video conferencing equipment, and the like. By way of example, the transmitting terminal 102 is a multimedia content provider, and the receiving terminal 104 is a subscriber of multimedia services entitling it to receive the multimedia content from the transmitting terminal 102.

The transmitting terminal 102 is shown with an encryption module 106 and the receiving terminal 104 is shown with a decryption module 108. The encryption module 106 may be used to generate SRTP packets. An SRTP packet includes an encrypted payload. A SRTP header may be attached to the SRTP packet. The SRTP header contains information such as the payload type, sequence number, time stamp, etc. An encryption function 110 may be used to encrypt the payload using a session key. The payload contains the data to be provided to the receiving terminal 108, e.g., multimedia content. An optional keyed hash function 113 may be applied to the SRTP packet and the SRTP header. The result of the hash function 113 produces a message authentication code (MAC) which may be appended to the end of the packet. The packet, along with the SRTP header and MAC, may then be transmitted over a communications link 114 to the receiving terminal 104 using an appropriate transmitter 115.

The communications link 114 may be any suitable wired or wireless link, or combination of the two. By way of example, one or both of the terminals 102, 104 may engage in wireless communications with a network access point using Code Division Multiple Access (CDMA) technology. CDMA is a modulation and multiple access scheme based on spread-spectrum communications and is well known in the art. The network access point may be a base station transceiver that serves a particular geographic area and provides access to a wired network, such as the Internet, through a gateway.

The SRTP packet, along with the SRTP header and MAC, is directed through the communications link 114 to a receiver 117 in the receiving terminal 104. The receiving terminal 104 may use the MAC to verify the authenticity and integrity of the SRTP packet. This may be achieved by applying the SRTP header and the encrypted payload to the same keyed hash function 116 used in the transmitting terminal 102. The resulting MAC produced by the keyed hash function 116 may then be compared to the transmitted MAC via a comparator 118. The decryption function 120 may be used to recover the payload if the MAC produced by the keyed hash function 116 agrees with the transmitted one.

The encryption and decryption modules 106, 108 may be implemented as stand-alone components, or distributed across one or more components within their respective terminals. The encryption and decryption modules 106, 108 may be implemented as hardware, firmware, software, or any combination thereof. For the purposes of explanation, the encryption and decryption modules 106, 108 will be described in terms of their functionality. The manner in which they are implemented will depend on the particular application and the design constraints imposed on the overall system. Those skilled in the art will recognize the interchangeability of hardware, firmware, and software configurations under these circumstances, and how best to implement the described functionality for each particular application.

In two-way multicast communications, such as videoconferencing, teleconferencing, etc., each party transmits as well as receives. Each terminal would therefore require both an encryption and decryption module in these applications. In these applications, the encryption and decryption modules may be separate components, integrated into a single component, or distributed across multiple components in their respective terminals. In the detailed description to follow, the transmitting and receiving terminals 102, 104 will be described with an encryption module 106 at one end of the communications link 114 and a decryption module 108 at the other end. Those skilled in the art will readily recognize how to extend the concepts described throughout this disclosure to two-way communications.

Figure 2:
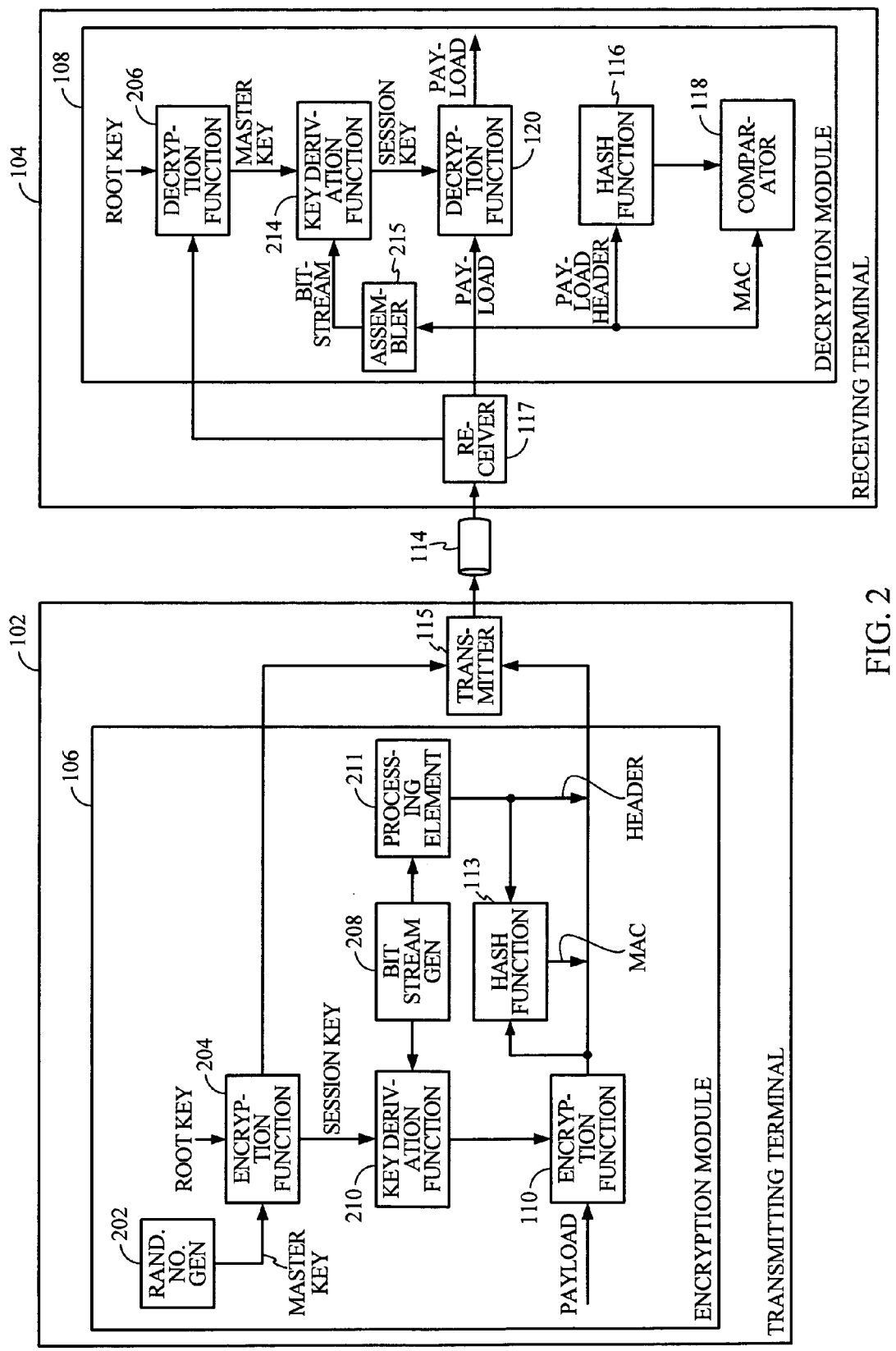
FIG. 2 is a more detailed functional block diagram illustrating an example of a transmitting and receiving terminal in a communications system.

FIG. 2 is a more detailed functional block diagram illustrating an example of a transmitting and receiving terminal in a communications system. The ability to engage in secured multimedia communications depends on a shared root key known by both the encryption and decryption modules 106, 108. The root key is initially set up as a configuration function. That is, the configuration manager or the network manager is responsible for distributing the root key to be loaded into memory on the various transmitting and receiving terminals 102, 104. This can be done manually or by using some form of secure key distribution scheme.

The root key may be used by the transmitting terminal 102 to distribute encrypted master keys to various receiving terminals. By way of example, a transmitting terminal that is a multimedia content provider may distribute encrypted master keys to subscribers of its services. The master key may be generated in the transmitting terminal 102 by a random number generator 202. A root key encryption function 204 may be applied to the master key before it is sent over the communications link 114 to the receiving terminal 104. The receiving terminal 104 can use its root key with a decryption function 206 to recover the master key.

The master key may be used by both the transmitting and receiving terminals 102, 104 to derive a session key for secured encrypted communications. A bit-stream generator 208 in the transmitting terminal may be used to generate a bit-stream, such as for example, a random number, which is often referred to in the art as a SK_RAND. A key derivation function 210 uses the bit-stream and the master key as inputs to generate the session key. The key derivation function 210 is a one-way encryption, such as a hash function or the like. The session key generated by the key derivation function 210 may then be used to encrypt the payload in a manner described in greater detail above.

The bit-stream may also be provided to a processing element 211 used to generate the header. By way of example, the processing element 211 may be used to generate information to be inserted in the MKI field of the SRTP header. Included in the information is the bit-stream. As explained in greater detail earlier, the SRTP header, along with the MAC, are attached to the SRTP packet, and sent across the communications link 114. At the receiving end, the bit-stream may be recovered from MKI field of the SRTP header and input with the master key to a key derivation function 214. The key derivation function 214 performs the same encryption function as the transmitting terminal 102. The result of the key derivation function 214 produces a session key that may be used by the decryption function 120 to recover the payload.

The processing element 211 may reduce the overhead associated with the SRTP header by sending the information in the MKI field in multiple packets. For example, the processing element 211 may be used to determine the number of packets (N) required to send the information by dividing the total bit length ($L_i$) of the information that needs to be sent by the minimum bit length ($L_{mki}$) of the MKI field allowed by the protocol. If the information that needs to be sent in the MKI field to the receiving terminal 104 is 24-bits in length, i.e., $L_i=24$, and the minimum bit length of the MKI field is 8 bits, i.e., $L_{mki}=8$, (as is the case in SRTP), then three packets may be used to send the information to the receiving terminal 104. If the information is 20-bits in length, i.e., $L_i=20$, then three packets may still be used, but the information will need to be padded with 4-bits before being split up into three packets. Alternatively, the information can be split between the three (3) packets first, and then the MKI field in one or more of the SRTP headers may be padded. In any event, the information is split up into N information portions, where N equals $L_i$ divided by $L_{mki}$ rounded up to the nearest integer. Each information portion is inserted in the MKI field of the SRTP header for one of the packets and transmitted with the encrypted payload and MAC across the communications link 114 to the receiving terminal 104.

At the receiving terminal 104, an assembler 215 may be used to recover the information from the MKI field of the N consecutive packets. If the information in the MKI field for one of the packets is padded, the padded segment is not used by the assembler 215 to recover the information from the MKI field of the N packets. Alternatively, if the recovered information is padded, the padded segment of the information may be discarded by the assembler 215. In any event, once the information is recovered, the bit-stream may be provided to the key derivation function 214 to generate the session key to decrypt the payload.

Figure 3:
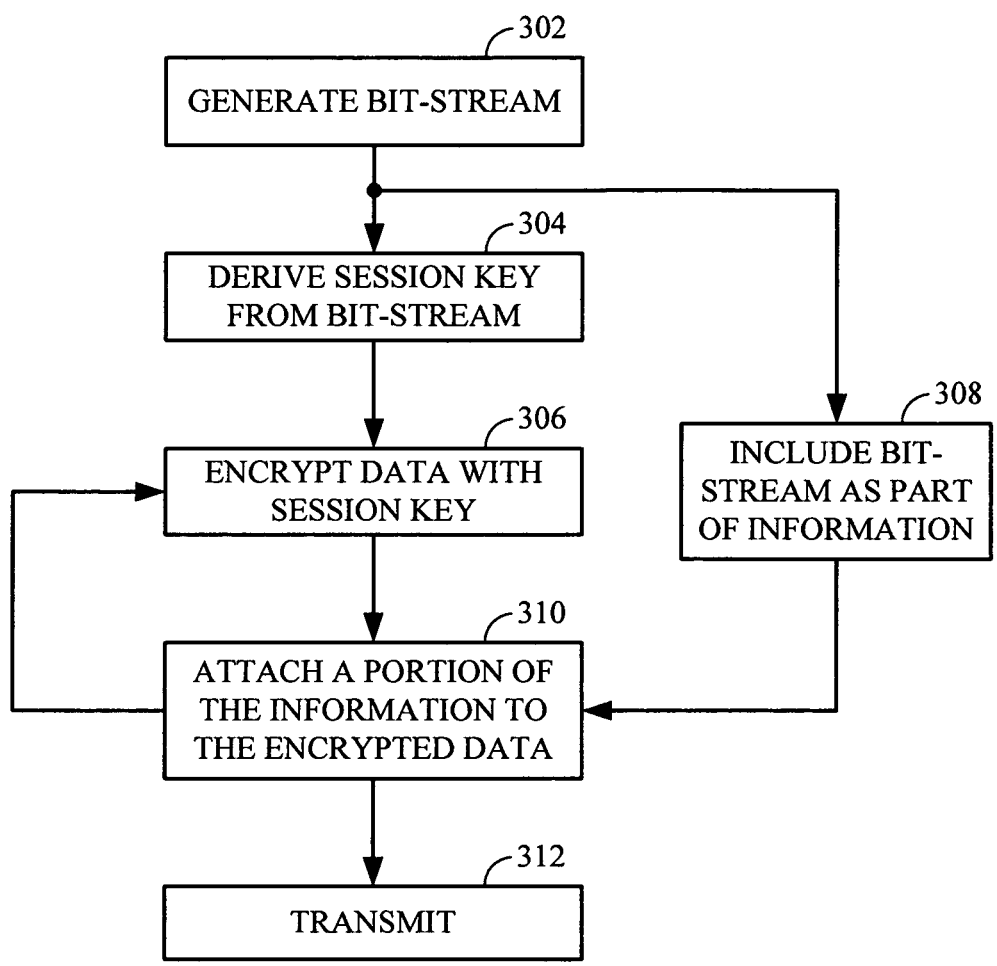
FIG. 3 is a flow diagram illustrating the operation of an encryption module.

FIG. 3 is a flow diagram illustrating the operation of an encryption module. In step 302, the encryption module may generate a bit-stream. The bit-stream may be used to derive a session key in step 304, and the session key may be used to encrypt data in step 306. In step 308, the bit-stream may be included as part of the information that is transmitted in the MKI field of the SRTP header. Alternatively, the bit-stream may be included as part of any information that is transmitted in the SRTP header. In the latter case, padding may be added to the MKI field in step 308, if the length of the MKI information is not evenly dividable by the minimum length of the MKI field allowed by the protocol. In any event, a portion of the information may be attached to a data packet having the encrypted data in step 310. Padding may be added in step 310 if the length of the MKI information portion is less than the minimum length of the MKI field allowed by the protocol. The data packet with the attached portion of the information may be transmitted in step 312. Returning to step 310, once the portion of the information is attached to the data packet, addition data may be encrypted in step 306 in preparation for the next data packet transmission. In some applications, the bit-stream may be the only information in the SRTP header that is divided and transmitted over multiple data packets.

Figure 4:
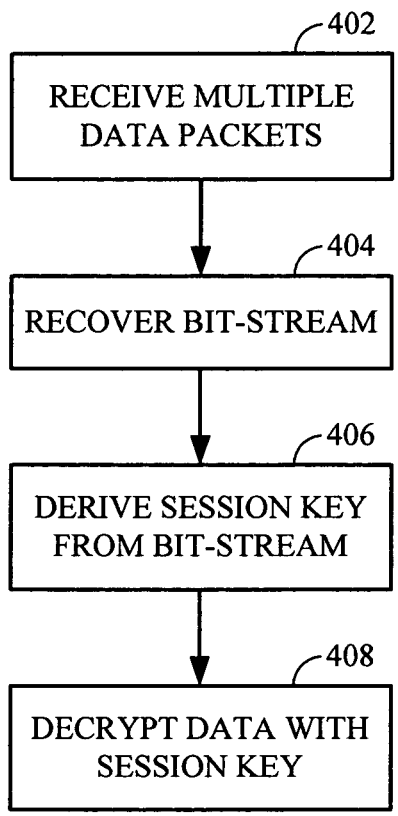
FIG. 4 is a flow diagram illustrating the operation of a decryption module.

FIG. 4 is a flow diagram illustrating the operation of a decryption module. In step 402, multiple data packets are received. A portion of the information is attached to each data packet. As explained above, the information may be from the MKI field of the SRTP header, or any other portion of the SRTP header. Alternatively, the information may consist solely of the bit-stream. In any event, the bit-stream may be recovered by assembling the information portions attached to the data packets in step 404. If a portion of the information attached to one of the data packets has been padded, the padded segment is not used when recovering the information. If the information, once recovered, is padded, then the padded segment of the information may be discarded. In step 406, bit-stream may be used to derive the session key, and in step 408, the session key may be used to decrypt the data in the data packets.

Figure 5:
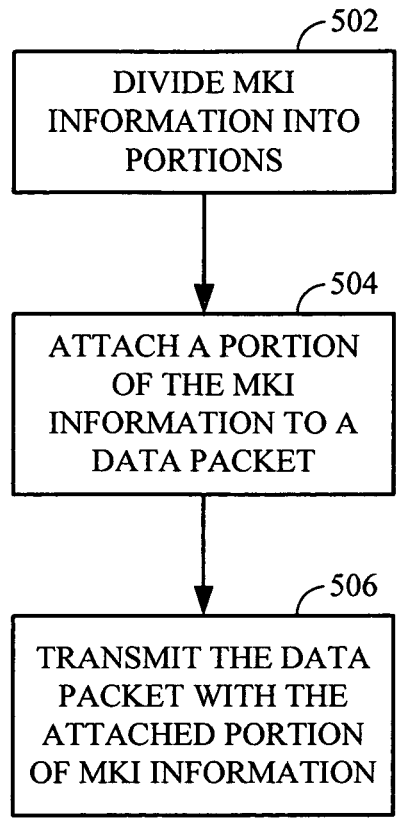
FIG. 5 is a flow diagram illustrating a method of transmitting MKI information using secure real time protocol.

FIG. 5 is a flow diagram illustrating a method of transmitting MKI information using secure real time protocol. In step 502, the MKI information is divided into a plurality of portions. A portion of the MKI information is attached to a data packet in step 504, and the data packet, with the attached portion of the MKI information, is transmitted in step 506.

Figure 6:
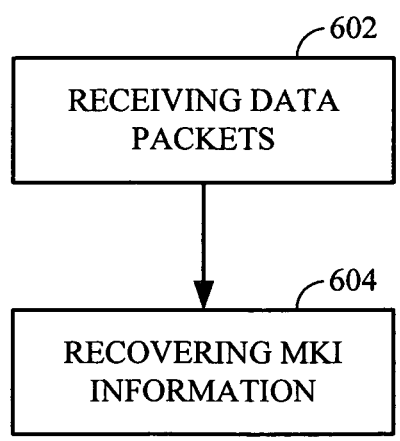
FIG. 6 is a flow diagram illustrating a method of receiving MKI information using secure real time protocol.

FIG. 6 is a flow diagram illustrating a method of receiving MKI information using secure real time protocol. In step 602, a plurality of data packets are received, with a different portion of the MKI information attached to each. In step 604, the MKI information is recovered from the received portions of the MKI information.

For example, assume that the MKI information is divided into smaller portions or chunks and transmitted in N packets. The MKI information may be recovered by gathering N consecutive MKIs and reassembling them into the information. Therefore, the MKI information can be processed in the same manner as it would have been if the information had been transmitted with every Nth packet. Also, it should be noted that the information may vary over time, but would remain the same for many data packets in a row.

By dividing and transmitting the information to be sent in the overhead into a plurality of portions, the overhead is, in effect, sent on every Nth packet rather than every packet. This significantly reduces the overhead of sending the MKI.

Although the flow diagrams describe the operation of the encryption and decryption modules as a sequential process, some of the operations can be performed in parallel or concurrently. In addition, the order of the operations may be rearranged. In some embodiments, certain steps may be omitted, or additional steps may be added depending on the particular application and the overall design constraints.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of transmitting Master Key Identifier (MKI) information, comprising:
   generating a session key from a bit-stream;
   encrypting payload data using the session key;
   generating MKI information including at least the bit-stream;
   dividing the MKI information into a plurality of portions;
   assembling a data packet containing one of the plurality of portions of the MKI information inserted into an MKI field of the data packet and at least a portion of the payload data encrypted by the session key; and
   transmitting the data packet including the one of the plurality of portions of the MKI information.

2. The method of claim 1, further comprising padding the one of the plurality of portions of the MKI information attached to the data packet.

3. The method of claim 1, wherein the generating the session key includes applying a key derivation function to a master key and the bit stream.

4. The method of claim 3, wherein the bit-stream includes a short term random number.

5. A method of receiving Master Key Identifier (MKI) information, comprising:
   receiving a plurality of data packets, the respective plurality of data packets including a disparate one of a plurality of portions of MKI information and at least a subset of payload data encrypted by a session key identified by the MKI information; and
   recovering the disparate portions of the MKI information from respective MKI fields in the plurality of data packets, recovering the MKI information from the plurality of portions of the MKI information received via the plurality of data packets;
   deriving the session key from the MKI information; and
   decrypting the payload data using the session key.

6. The method of claim 5, wherein the recovering includes recovering the MKI information having at least one padding bit.

7. The method of claim 6, further comprising discarding the at least one padding bit after the recovering.

8. The method of claim 5, wherein the recovering the MKI information includes recovering a bit-stream that facilitates derivation of the session key.

9. The method of claim 8, wherein the recovering the bit-stream includes recovering a short term random number.

10. An apparatus, comprising:
    a key derivation component configured to derive a session key from a bit-stream;
    an encryption component configured to encrypt payload data using the session key;
    a processing element configured to generate Master Key Identifier (MKI) information from the bit-stream, divide the MKI information into a plurality of portions, and assemble to data packet containing one of the plurality of portions of the MKI information inserted into an MKI field of the data packet and at least a subset of the payload data encrypted by the session key; and
    a transmitter configured to transmit the data packet including the one of the plurality of portions of the MKI information.

11. An apparatus, comprising:
    a receiver configured to receive a plurality of data packets, the plurality of data packets respectively comprising disparate portions of Master Key Identifier (MKI) information and at least a subset of payload data encrypted using a session key identified by the MKI information; and
    a decryption module configured to recover the disparate portions of the MKI information from respective MKI fields in the plurality of data packets, recover the MKI information from the disparate portions of the MKI information received via the data packets, derive the session key from the MKI information, and decrypt the payload data encrypted by the session key.

12. An apparatus, comprising:
    means for deriving a session key using a bit-stream;
    means for encrypting payload data using the session key;
    means for creating a Master Key Identifier (MKI) information using the bit-stream;
    means for dividing the master Key Identifier (MKI) information into a plurality of portions;
    means for assembling a data packet containing one of the plurality of portions of the Master Key Identifier (MKI) information inserted into an MKI field of the data packet and at least a subset of the payload data encrypted using the session key; and
    means for transmitting data packet including the one of the plurality of portions of the Master Key Identifier (MKI) information and the at least a subset of the payload data.

13. The apparatus of claim 12, further comprising means for padding the one of the plurality of portions of the Master Key Identifier (MKI) information attached to the data packet.

14. The apparatus of claim 12, further comprising means for padding the Master Key Identifier (MKI) information.

15. A non-transitory computer-readable medium having stored thereon computer-executable instructions that, in response to execution, cause a computer system to perform operations, including:
    receiving a plurality of data packets, the plurality of data packets containing respective different portions of Master key Identifier (MKI) information and at least a portion of payload data encrypted using a session key derived from the MKI information; and
    recovering the disparate portions of the MKI information from respective MKI fields in the plurality of data packets, recovering the MKI information from the different portions of the MKI information received via the plurality of data packets;
    generating the session key from the MKI information; and
    decrypting the payload data using the session key.

16. The non-transitory computer-readable medium of claim 15, wherein the recovering includes recovering the MKI information including at least one padding bit.

17. The non-transitory computer-readable medium of claim 15, further comprising discarding the at least one padding bit after the recovering.

18. The method of claim 1, wherein the dividing includes:
dividing a total bit length of the MKI information by a minimum bit length of the MKI field to determine a first value;
rounding the first value up to a nearest integer N; and
dividing the MKI information into N portions.

19. The method of claim 18, further comprising attaching the N portions to respective N data packets.

20. The method of claim 5, wherein the recovering includes assembling the plurality of portions of the MKI information.

21. The apparatus of claim 10, wherein the encryption module is further configured to divide a total bit length of the MKI information by a minimum bit length of the MKI fiend to yield an intermediate result, and round the intermediate result up to a nearest integer N to determine a number of portions into which to divide the MKI information.

22. The apparatus of claim 11, wherein the decryption module is further configured to derive the session key using the MKI information and decrypt the payload data using the session key.

23. The non-transitory computer-readable medium of claim 15, wherein the recovering includes assembling the different portions of the MKI information.

\* \* \* \* \*